United States Patent [19]

Wu

[11] Patent Number: 5,232,881
[45] Date of Patent: Aug. 3, 1993

[54] USE OF SURFACTANTS IN PROCESSING ABRASIVE PIGMENTS

[75] Inventor: Joseph H. Z. Wu, Somerset, N.J.
[73] Assignee: Engelhard Corporation, Iselin, N.J.
[21] Appl. No.: 971,006
[22] Filed: Nov. 3, 1992

Related U.S. Application Data

[63] Continuation-in-part of Ser. No. 898,116, Jun. 12, 1992.
[51] Int. Cl.$^5$ ............................................... C04B 33/04
[52] U.S. Cl. ................................. 501/148; 162/181.5; 162/181.8; 106/447; 106/487
[58] Field of Search ................ 106/447, 487; 501/148; 162/181.5, 181.8

[56] References Cited

U.S. PATENT DOCUMENTS

| | | | |
|---|---|---|---|
| 3,014,836 | 11/1961 | Proctor | 162/181 |
| 3,058,671 | 4/1962 | Billue | 241/24 |
| 3,130,063 | 1/1964 | Millman et al. | 106/308 |
| 3,171,718 | 7/1965 | Gunn et al. | 23/110 |
| 3,343,943 | 3/1967 | Billue | 106/288 |
| 3,451,835 | 6/1969 | Gatter et al. | 106/447 |
| 3,582,378 | 7/1971 | Miller | 106/288 Q |
| 3,586,523 | 6/1971 | Fanselow et al. | 106/288 B |
| 3,846,147 | 1/1974 | Tapper | 106/288 B |
| 4,017,324 | 2/1977 | Eggers | 106/288 B |
| 4,381,948 | 4/1983 | McConnell et al. | 106/288 B |
| 4,830,673 | 5/1989 | Jones et al. | 106/487 |
| 5,006,574 | 6/1991 | Sennett et al. | 43/351 |
| 5,028,268 | 4/1991 | Ince et al. | 106/416 |
| 5,034,062 | 3/1991 | Lein et al. | 106/416 |
| 5,112,782 | 10/1992 | Brown et al. | 106/416 X |

OTHER PUBLICATIONS

"Scale Inhibitors", Rohm & Haas, Polymer Additives for Aqueous Systems, Industrial Chemicals; Oct., 1985.

Primary Examiner—Mark L. Bell
Assistant Examiner—Chris Gallo
Attorney, Agent, or Firm—Inez L. Moselle

[57] ABSTRACT

The present invention provides a simple inexpensive means to decrease the abrasivity of abrasive pigments such as calcined kaolin and titania. In accordance with this invention, a trace of a nonionic surfactant of the general formula

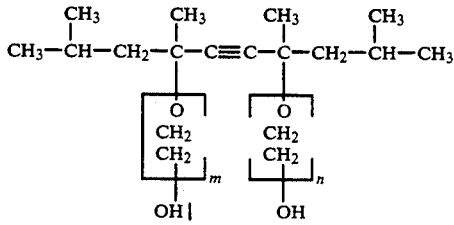

m + n = number of moles of ethylene oxide is incorporated with abrasive pigment prior to or during the preparation of an aqueous pigment slurry or to dry pigment.

18 Claims, No Drawings

USE OF SURFACTANTS IN PROCESSING ABRASIVE PIGMENTS

RELATED APPLICATIONS

This is a continuation-in-part of U.S. Ser. No. 07/898,116 filed 6/12/92.

BACKGROUND OF THE INVENTION

This invention relates to the addition of nonionic surfactants to abrasive pigments such as calcined clay to reduce the abrasivity of the pigment without causing foaming. The surfactant is a polyoxyethylated acetylenic glycol.

Calcined kaolin and titania pigments have been used for several decades in a number of industrial applications such as paper coating, paper filling, paints, plastics, etc. In those applications they impart to the finished products a number of desirable properties: brightness, opacity and hiding power. In the case of calcined kaolin pigments, paper coating and filling applications require almost exclusively ultrafine fully calcined kaolin pigments such as ANSILEX 93 ® pigment manufactured by Engelhard Corporation. See, for example, U.S. Pat. No. 3,586,523, Fanselow, et al., the teachings of which are incorporated herein by cross-reference These fully calcined pigments have an undesirable property, namely, they are relatively abrasive when compared to noncalcined (hydrous kaolin pigments) or, in some cases, partially calcined (metakaolin) pigments. For example, conventional so-called "low abrasion" calcined kaolin pigments typically have an Einlehner abrasion value of about 20 mg. An ultrafine calcined kaolin pigment which has recently been introduced to the paper industry has a lower abrasion but appears to have lower scatter properties than that of the somewhat coarser but more abrasive products such as ANSILEX 93 ® pigment. In practical terms, increased abrasivity translates into increased wear of bronze web forming screens (wires) on paper making machines, dulling of paper slitter knives, wear of printing plates when they come into contact with coated paper containing fine calcined pigments in the coating formulation, and, in general, wear of any surfaces coming into contact with these pigments. Titanium dioxide pigments are generally significantly more abrasive than fully calcined kaolin pigments and abrasivity causes similar problems.

Paper makers are becoming increasingly demanding in their need for lower abrasion. To overcome the problem when utilizing a calcined kaolin pigment, a suitable hydrous grade of kaolin can be calcined at temperatures less than those required to produce fully calcined pigments. In this instance, calcination temperature is controlled to produce the form of pigment known as metakaolin. It is known, however, that the brightness of a metakaolin pigment is always poorer, generally by about 2-3%, than that of fully calcined pigments derived from the same clay calciner feed. However, even metakaolin pigments may be more abrasive than paper makers may desire. Nonlimiting examples of patents disclosing calcination of kaolins to provide pigments include: U.S. Pat. No. 3,586,523, Fanselow, et al.; U.S. Pat. No. 3,014,836, Proctor; U.S. Pat. No. 3,058,671, Billue; U.S. Pat. No. 3,343,943, Billue; U.S. Pat. No. 3,171,718, Gunn, et al.; U.S. Pat. No. 4,381,948, McConnell, et al. and U.S. Pat. No. 5,112,782, Brown, et al. Many of these patents make reference to the desirability of reduced abrasivity; however, such result is achieved by kaolin crude selection and/or processing conditions utilized in steps carried out prior to the final calcination of the original hydrous kaolin feed.

Originally kaolin pigments were supplied in dry form to the end users. The demand for pigments in aqueous slurry form developed with the availability of appropriate shipping and handling facilities. Since the cost of shipping water is an undesirable expense, it is desirable to provide pigment slurries as concentrated as is feasible, consistent with the necessity of formulating slurries that are sufficiently fluid to be pumped yet are resistant to settling. This posed no significant problem when formulating slurries of hydrous (uncalcined kaolins). Thus, using conventional anionic clay dispersants such as condensed phosphate salts and conventional clay handling equipment, 70% solids slurries of fine particle size coating grade hydrous kaolin were readily achieved.

With the advent of ultrafine calcined kaolin pigments such as ANSILEX ® pigment, there was a greater challenge to prepare higher solids slurries of the pigments. However, the achievable high solids were limited by the requirement to assure satisfactory rheology and resistance to settling. In fact, 50% solids slurries of such pigments were difficult to achieve. When solids content increases, both high shear viscosity and low shear viscosity tend to increase. A higher low shear viscosity (such as a high Brookfield) and a lower high shear viscosity (such as a lower Hercules) are desirable. The high shear viscosity could be an indicator of pumpability and the low shear viscosity could be an indicator of settling. The dispersants commonly used usually give a low Brookfield viscosity, which could be an indication of fast settling tendency. When the Hercules viscosity becomes too high (meaning small rpm number) the slurry is not pumpable.

U.S. Pat. No. 5,028,268, Ince, et al., summarizes prior art efforts to improve rheology of aqueous slurries of calcined kaolin. This patent teaches spray drying a slurry of calcined kaolin powder and forming an aqueous slurry from the spray dried powder. Slurries containing 58% and 60% solids are described. Among the references cited in this patent is U.S. Pat. No. 4,017,324, Eggers. In accordance with this patent hydrous kaolin was added along with calcined kaolin in a slurry which also included a suspending agent such as CMC along with a dispersant. This was a development subsequent to the proposal in U.S. Pat. No. 3,130,063 to Millman, et al. to add an organic polymer to a predispersed suspension of coarse hydrous kaolin clay to prevent settling. In accordance with the searchings of Eggers, slurries of mixtures of calcined and hydrous clay having 50% to 75% solids were reported. The dispersant used in illustrative examples was a mixture of relatively large amounts of TAMOL ®731 (sodium salt of polymeric carboxy acid) and TRITON ®X-100 (octylphenoxy polyethoxyethanol). Although the presence of appreciable hydrous clay would be expected to result in a pigment mixture having lower abrasion than that of the calcined kaolin constituent, this approach necessitates an undesirable dilution of calcined clay with a material that is not to calcined kaolin terms of paper sheet properties. Another approach to handling calcined clay pigments was to use sufficient alkaline agent to provide a pH in excess of 8 to render the suspension free from settling (See U.S. Pat. No. 3,846,147, Tapper). Properties of suspensions having up to 57% solids are described in that patent. In illustrative examples large amounts (30#/ton) of NOPCOSANT L and K were used to produce 58% solids suspensions. (NOPCOSANT is the trademark for anionic polymeric dispersants, namely, sodium salt of condensed naphthalene sulfonic acid.)

U.S. Pat. No. 5,034,062, Lein, et al., discloses the use of acid-containing anionic emulsion copolymers as calcined clay slurry stabilizers. The patent mentions the steep rise in high shear viscosity at solids levels above 50%. This patent broadly discloses that anionic and nonionic surfactants can be included in the slurries when it is desirable to produce dispersed slurries.

Other patents relating to the production of slurries of calcined kaolin clay or calcined pigments derived from kaolin clay are U.S. Pat. No. 3,582,378, Miller and U.S. Pat. No. 5,006,574, Sennett, et al., both assigned to the assignee of the subject patent application.

Thus, the kaolin industry has spent many years in developing calcined kaolin pigments having lower abrasion and has expended a significant effort in producing concentrated slurries of calcined kaolin pigments that are stable. Various materials identified as surfactants or dispersants have been proposed in the development of stable slurries. To the best of the inventor's knowledge, however, none of the efforts directed to reducing abrasion have utilized surfactant addition to previously calcined kaolin and none of the research and development efforts addressing slurry stability focused on abrasion. The problem of pigment abrasion is unrelated to the rheology problem. Nonetheless, an improvement in pigment abrasion that would be adverse to the provision of a stable, nonsettling slurry is not a commercially viable solution to the abrasion problem.

The invention described in U.S. Ser. No. 07/898,116 arose from the inventor's theory that addition of certain surfactants in very small amounts would reduce the abrasion of abrasive pigments such as calcined kaolin by reducing the friction between the pigment and wires and cutting blades used in paper making. This novel approach to a solution to the abrasion problem is believed to be nonobvious from the prior art. By practice of that invention, lower abrasion was achieved without the need to add a low abrasion uncalcined kaolin and thereby reduce the optical performance which would occur in practice of the pigment dilution process described in U.S. Pat. No. 4,017,324 (supra). However, it was found that undesirable foaming may occur when vigorous stirring or blending is applied to a system containing surfactants such as Triton X-100, that are eminently effective in reducing abrasion. The problem can occur when the surfactant is added to the pigment or subsequently, for example, when a tank or other vessel containing a slurry of the pigment is cleaned by use of a pressurized stream of water.

The present invention relates to an improvement in the technology disclosed and claimed in U.S. Ser. No. 07/898,116, whereby foaming associated with surfactants such as Triton X-100 useful in reducing abrasion is reduced or eliminated.

SUMMARY OF THE INVENTION

The present invention provides a simple inexpensive means to decrease the abrasivity of abrasive pigments such as calcined kaolin and titania while avoiding or minimizing foaming during pigment preparation, handling or use. In accordance with this invention, a trace of a nonfoaming or defoaming nonionic surfactant is incorporated with the abrasive pigment prior to or during the preparation of an aqueous pigment slurry. Alternatively, a solution of the surfactant can be added to dry pigment. Surfactants used in practice of this invention are polyoxyethylated acetylenic glycols and have the following structural formula:

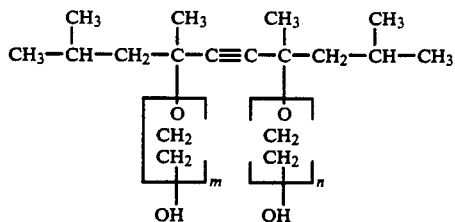

wherein m+n=number of moles of ethylene oxide and is in the range of 1.3 to 30.

The term "nonfoaming" as used herein refers to a surfactant which does not foam in an aqueous system under normal conditions; the term "defoamer" refers to a substance used to reduce foaming due to proteins, gases or nitrogenous materials which may interfere with processing.

DETAILED DESCRIPTION OF THE INVENTION

Surfactants used in practice of this invention are commercially available as SURFONYL ®400 series surfactants. They vary in ethylene oxide content from 1.3 to 30. Presently, preferred are surfactants in which n+m range from 1.3 to 3.5 (SURFONYL ®420 and SURFONYL ®440 series surfactants).

The following are published properties of Surfonyl surfactants:

| | Surfynol 420 | Surfynol 440 | Surfynol 465 | Surfynol 485 |
|---|---|---|---|---|
| Ethylene Oxide Content | | | | |
| Moles | 1.3 | 3.5 | 10 | 30 |
| Percent by Weight | 20 | 40 | 65 | 85 |
| Specific Gravity @ 25° C. | 0.943 | 0.982 | 1.038 | 1.080 |
| APHA Color | 350 | 350 | 350 | 350 |
| pH (1% aqueous solution) | 6–8 | 6–8 | 6–8 | 6–8 |
| Viscosity @ 20° C., cps | <250 | <200 | <200 | <350 |
| Pour Point (ASTM D97) | −13° F. | −55° F. | 44° F. | 85° F. |
| Cloud Point (5% solution) | — | — | 63° C. | >100° C. |
| HLB (Hydrophile-Lipophile Balance) | 4 | 8 | 13 | 17 |

SURFYNOL ®440 is produced by reacting ethylene oxide with Surfynol 104 surfactant-a white, waxy solid: 2,4,7,9-tetramethyl-5-decyne-4,7 diol. Surfynol 104 is a nonionic molecule with a hydrophilic section in the middle of two symmetric hydophobic groups, and has multifunctional benefits, including wetting and foam control in aqueous systems. Adding ethylene oxide to Surfynol 104 surfactant increases the hydrophilic nature of the product, modifying its water solubility, wetting and defoaming characteristics. SURFYNOL ®440 is a nonfoaming/defoaming nonionic surfactant. SURFYNOL ®440 complies with FDA regulations 21 CFR 176.170 and 176.180. It has been reported that SURFYNOL ®440 surfactant can help to eliminate fisheyes, pinholes, and other surface defects in coating applications by improving flow characteristics while controlling or reducing foam.

The amount of nonionic polyoxyethylated acetylenic glycol surfactant depends upon the adsorption on the surface of the pigment particles, the reaction with other ingredients in the slurry. The total amount of surfactant may be from 0.002% to 1.0% (based on dry pigment), preferably from 0.02% to 0.5%, most preferably from 0.05% to 0.2%. When excess of surfactant is used, the abrasion reduction may not be as efficient and/or the surfactant may cause foaming. When an insufficient amount is employed, the abrasion may not be reduced significantly.

It is believed that all surfactants of the Surfynol series can be used to treat pigments and lower their abrasion. When the number of moles of ethylene oxide increases above 3.5 [please verify] (i.e., Surfynol 465), the foaming tendency may undesirably increase. On the other hand, when the number of moles of oxide decreases, such as Surfynol 420 which has an HLB of 4 (comparing to 8 for SURFYNOL ®440), the foaming tendency of the surfactant should decrease and the surfactant may function as a defoamer and thus further improve the slurry properties. However, a larger dosage of Surfynol 420 may be needed for an abrasion reduction treatment because of the fewer numbers of ethylene oxide in the molecule.

It is recommended to follow a suitable sequence of processing steps when it is also desirable to produce high solids slurries. Mixers with high shear blades, such as a Cowles system, are suitable for making down high solids calcined kaolin slurries. Although some other equipment may also have high work input into the clay, such as a pugger, it may not be as suitable as a Cowles mixer. The impurity of the water has a dramatic impact on the viscosity, as well as the stability of the slurry. For instance, in making down a 60 wt % solids slurry of calcined clay, when water contained as low as 3 ppm of $Na^+$, the Brookfield viscosity decreased more than 80%, and the slurry became unstable. At the beginning of makedown, for example after the first half of the clay has been added, the solids content in the slurry is low, and the make down is easy, even though no surfactants or dispersants are in the slurry. An appropriate dosage of a nonfoaming surfactant such as Surfynol 440 can be added to water before addition of clay. Foaming should not occur using this surfactant because it is nonfoaming. It is preferable to add Surfynol surfactant or other polyothyethylated acetylenic glycol surfactant after about ½ of the clay has been added and before the slurry (with full amount of clay) is subjected to high shear work mixing. In such a way there is less tendency to foam and higher efficiency in utilizing Surfynol.

It is important to utilize a high shear rate during mixing to form a high solids slurry. If too low a rate is used, the viscosity of the slurry may remain poor. Even large amount of shear work may be input to the slurry after a long period of low shearing.

Slurries of the invention may have pH values in the range of about 4 to 10, usually in the range of 5 to 8. In addition to pigment, water and surfactant, materials conventionally used in pigment slurry preparation may be present. Examples of such materials are biocides, colloidal thickening agents, CMC and other dispersants. For example, up to about 0.2% by weight of an acrylate pigment dispersant may also be present.

To decrease foaming tendency, one could use a non-foaming surfactant or a defoamer plus a foaming surfactant, such as TRITON X-100. However, use of a nonfoaming SURFYNOL ®440 as the sole surfactant is advantageous because of the simplicity of processing.

Pigments which may be especially benefitted by addition of surfactant include fully calcined kaolin, preferably fine particle size fully calcined kaolin having an average size of about 0.6 to 0.8 microns, metakaolin pigments and titanium dioxide. These may be used alone or in admixture with each other. Other abrasive pigments which may be improved include, by way of example, bentonite, ground carbonate minerals such as calcite or other forms of calcium carbonate and spinels. Generally, pigments which are amenable to the treatment have abrasion values above 10 when tested by the Einlehner test described hereinafter.

The surfactant can be mixed with the abrasive pigment during slurry makedown, producing slurries containing, for example, from 10% to about 60% solids. Alternatively, a solution of the surfactant can be added to dry pigment, with drying optional.

It is believed that surfactants used in the invention influence the surfaces and/or interactions between surfaces of the kaolin particles, and between surfaces of the particles and other surfaces which are in contact with them (such as blades of mixers, machine parts in contact with them, etc.). When a slurry system is crowded (the clay particles frequently in contact with each other and with other machinery surfaces), similar effects should be exhibited.

In the Einlehner Abrasion test, the weight loss of a wire disc contacted by a rotary abrader and test material is used as a relative measure of the abrasiveness of the test material. Details of the procedures and equipment used to obtain values reported in this application are as follows:

Materials and Apparatus

1. Einlehner AT1000
2. Phosphor Bronze P.M. Wire Discs
3. Ultrasonic Bath
4. Vacuum desiccator
5. Tallboy Mixer
6. Usual laboratory equipment such as: balance (analytical and top loading), glassware, pH meter, oven.
7. Reagents
   a. 5% by weight Sodium Pyrophosphate Solution (TSPP)
   b. Deionized Water
   c. Isopropyl Alcohol
   d. 1:1 NaOH Sample Preparation 1. Weigh 150 grams of sample to be tested. Measure 850 ml of deionized water and pour 75% into a 1 liter stainless steel beaker and add the weighed out 150 grams of sample. Save the remaining amount of deionized water to flush the slurry when it is later poured into the test cylinder.
2. Adjust pH of slurry to 7.0 using 5% TSPP solution or 1:1 solution of HCL.
3. Mix slurry 10 minutes on Tallboy mixer.

Sample Evaluation

1. Prepare test screens by placing several screens into a 250 beaker of micro detergent and deionized water. Place beaker into a ultrasonic bath for 5 minutes.

2. After treatment remove screen and wash thoroughly with deionized water. Dry screen with isopropyl alcohol. Then dry in oven at 105° C. for 15 minutes. Place screen into desiccator until needed.
3. Weigh treated test screen and place, with the marked side (blue side) facing the floor plate of the test cylinder, and assemble unit.
4. Place the rotary abrader on the tip of the rotating shaft. Make sure abrader is in the proper starting position (position 1-5).
5. Pour slurry into test cylinder and use the deionized water that was previously saved to flush any slurry that may remain in the stainless steel beaker.
6. Choose the appropriate instrument setting (Table I). Lower agitator shaft and put toggle switch to the on position to begin test.
7. Test is completed when the prescribed rotations are completed. The instrument will automatically shut off.
8. Raise the agitator shaft, remove the cylinder and remove test screen.
9. Wash test screen with deionized water and place in micro solution. Place in sonic bath for 5 minutes. Rinse with isopropyl alcohol.
10. Dry screen in oven at 105° C. for 15 minutes. Place screen into desiccator to cool.
11. Weigh screen to nearest 0.1 mg.
12. Report results according to calculation.

Calculation:

$$\frac{100,000}{\text{No of revolutions}} \times \text{mg. wt. loss} = \text{abrasion (mg/100,000 rev.)}$$

Settings and Number of Rotations

| Settings | 1 | 2 | 3 | 4 | 5 |
|---|---|---|---|---|---|
| Number of Rotations × 10³ | 7.25 | 21.75 | 43.5 | 87 | 174 |

Note:
A cycle time should be chosen to give a weight loss of at least 10 mg. but not over 40 mg.
Hydrous Kaolins are run using setting 5
Calcined Kaolins are run using setting 3

Test Precision

The precision of the Einlehner method is based on data generated from four of assignee's facilities. The sample run at all facilities was ANSILEX®93/50% solids slurry. Setting 3 was used in all testing. The data are as follows:

| Laboratory | #1 | #2 | #3 | #4 |
|---|---|---|---|---|
| Av. | 17.5 | 16.7 | 16.3 | 16.6 |
| 95% Confi. | 3.1 | 3.1 | 2.8 | 3.4 |

Foaming Test

The foaming tendency was assessed qualitatively by observing the foaming in the process of making down slurries. Details of the procedure of the sample preparation were as follows.

Surfactant was added at the selected levels into 577 grams of deionized water, containing Na+ <0.02ppm, Ca++ <0.02ppm. Six hundred twenty-five grams of fully calcined kaolin powder was added gradually into the beaker while the system was mixed by a Dispersator (model No. 89, Premier Mill Corp.) with a 1" blade at 2800 rpm. A solids content of 52wt % was reached when all dry pigment was added in. The speed of dispersator was increased to 8000 rpm, and continued for 2 minutes. The slurry was finally diluted to 50 wt %.

EXAMPLE I

The Einlehner abrasion of fully calcined kaolin pigments treated by nonionic surfactants of the octylphenol and nonylphenol ethylate types with different HLBs were evaluated. TRITON X series (octylphenol ethoxylates) and N series (nonylphenol ethoxylates) surfactants with different HLBs were used.

The molecules of the TRITON X series used in the study have the following common structure:

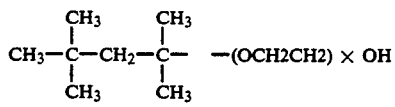

The only difference in the molecular structure occurs in their number of oxide units. For instance, TRITON X-100 has 9 to 10 units, while X-45 has only 5 units, and X-307 has 30 units.

The molecules of the TRITON N series used in the study have the following common structure:

The only difference in the molecular structures of N series and X series is the alkyl group: C8 or C9. The TRITON N-101 used in the study has the same number of oxides of that of TRITON X-100. Therefore, in this study, the number of carbon changed in either the alkyl groups or the alcohol groups.

The procedure of the sample preparation used in all tests was as follows: Surfactant was added at the selected levels (0.1 wt % or 0.2 wt %), based on dry clay) into 577 grams of DI (deionized) water, containing Na+ <0.02ppm, Ca++ <0.02ppm. Six hundred twenty-five grams of fully calcined kaolin (ANSILEX PIGMENT®93 pigment) powder was added gradually into the beaker while the system was mixed by a Dispersator (model No. 89, Premier Mill Cop.) with a 1" blade at 2800 rpm. A solids content of 52 wt % was reached when all dry pigment was added in. The speed of Dispersator was increased to 8000 rpm, and continued for 2 minutes. The slurry was finally diluted to 50 wt % solids. The Einlehner abrasion results of the tests are tabulated in Table 1.

TABLE 1

EINLEHNER ABRASION OF CALCINED KAOLIN PIGMENTS TREATED BY TRITON SURFACTANTS

| Surfactant | Moles Ethylene Oxide | HLB | Dosage wt % | Einlr (mg) | Foaming Tend.* |
|---|---|---|---|---|---|
| None (control) | | | | 22.5 | |
| X-45 | 5 | 10.4 | 0.1 | 19.5 | 1 |
| | | | 0.2 | 12.3 | |
| X-114 | 7-8 | 12.4 | 0.2 | 16.8 | 1 to 2 |
| X-100 | 9-10 | 13.5 | 0.1 | 11.0 | 2 |
| X-102 | 12-13 | 14.6 | 0.1 | 18.3 | 2 to 3 |
| | | | 0.2 | 11.8 | |
| X-305 | 30 | 17.3 | 0.1 | 14.5 | 1 |
| | | | 0.2 | 15.3 | |
| N-101 | 9-10 | 13.4 | 0.1 | 15.3 | 2 |

TABLE 1-continued

EINLEHNER ABRASION OF CALCINED KAOLIN
PIGMENTS TREATED BY TRITON SURFACTANTS

| Surfactant | Moles Ethylene Oxide | HLB | Dosage wt % | Einlr (mg) | Foaming Tend.* |
|---|---|---|---|---|---|
| | | | 0.2 | 13.8 | |

*Foaming tendency was rated qualitatively from 1 to 3; 1 being the lowest, 3 the highest.

Data in Table 1 show that Triton X-100, X-102 and X-45, could be used to reduce the abrasion to a similar degree. No simple relationship was found between the HLB values and the Einlehner reduction. Results in Table show that the foaming tendency of the Triton X, series surfactants varied as a function of their HLB. When the HLB increases, the foaming tendency increases. At HLB 14.6 (Triton X-102), the foaming tendency reached its peak, and decreased when HLB further increased to 17.3 (Triton X-305). The foaming tendency of Triton N-101 was equivalent to that of X-100 because their HLB number are comparable.

EXAMPLE II

The following tests demonstrate advantages of the invention.

Slurries were prepared using Surfonyl 440 surfactant in laboratory using a Dispersator (model No. 89, Premier Mill Corp.) with 1" blade. SURFYNOL®440 at 0.1 wt % or 0.2% level (based on dry clay) was added as a surfactant into 577 grams of DI water, containing Na+ <0.02ppm, Ca++ <0.01 ppm. Six hundred twenty five grams of fully calcined kaolin (ANSILEX 93) system was mixed at 2,800 rpm. A 58 wt % solids was reached when all dry pigment was added in. The speed of the dispersator was increased to 8000 rpm, and continued for 2 minutes.

Foam was not observed in the makedown of the SURFYNOL®440 treated (0.1% and 0.2% levels) slurries of Ansilex 93 pigment, even under high shear (10000 rpm). Also, foam was not developed in an aqueous solution (0.2% level) to which a vigorous stirring was applied for 10 minutes using the Dispersator with a 1" blade.

The Einlehner abrasion results of the SURFYNOL®440 treated Ansilex 93 are shown in Table 2 and demonstrate that reduction in foaming was not achieved by sacrificing abrasion reduction.

TABLE 2

EFFECT OF SURFYNOL ® 440 ON
ABRASION OF ANSILEX 93 PIGMENT

| Dosage % | Einlr (mg) |
|---|---|
| 0.1% | 9.5 mg |
| 0.2% | 10.4 mg |
| Control | 16.2 mg |

I claim:

1. An improved pigment composition comprising particles of an abrasive pigment uniformly mixed with a nonionic surfactant having the general formula:

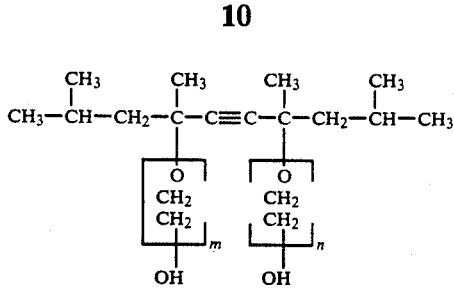

wherein $m+n = 1.3$ to 30,
said surfactant being present in an amount effective to reduce the Einlehner abrasion of said abrasive pigment.

2. The pigment of claim 1 wherein abrasive pigment is selected from the group consisting of metakaolin, fully calcined kaolin, titania and mixtures thereof.

3. The pigment of claim 1 wherein said surfactant is present in amount in the range of from 0.02% to 0.5% by weight of said pigment.

4. The pigment of claim 1 wherein said surfactant is present in amount of from 0.02% to 0.2% by weight of said pigment.

5. The pigment of claim 1 wherein $n+m$ is in the range of 1.3 to 3.5.

6. The pigment of claim 1 which is in the form of an aqueous slurry.

7. An improved pigment consisting essentially of particles of fine particle size fully calcined kaolin clay mixed with from 0.02% to 0.4% by weight of a water-soluble nonionic surfactant of the general formula:

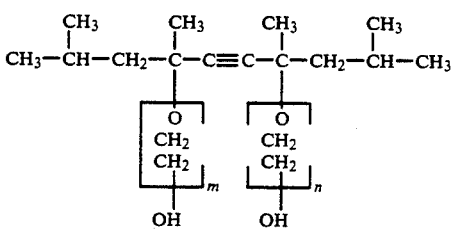

wherein $m+n = 1.3$ to 30,
said amount of surfactant being effective to reduce the Einlehner abrasion of said particles of calcined kaolin clay.

8. The pigment of claim 7 wherein $n+m$ is in the range of 1.3 to 3.5.

9. The pigment of claim 7 which is in the form of an aqueous slurry having a clay solids content above 15% by weight.

10. The pigment of claim 9 which has a clay solids content about 45% by weight.

11. The pigment of claim 9 which contains 0.1% to 0.2% of said surfactant based on the weight of said calcined kaolin.

12. The pigment of claim 9 wherein the average particle size of said calcined kaolin is in the range of 0.6 to 0.8 microns.

13. The pigment of claim 9 which contains less than 0.5% by weight of an organic colloidal thickening agent.

14. A slurry consisting essentially of water and particles of fully calcined clay pigment having an average size in the range of 0.6 to 0.8 microns, said slurry having a pH in the range of 5 to 8 and containing from 0.02% to 0.2% based on the weight of said pigment of a nonionic surfactant of the general formula:

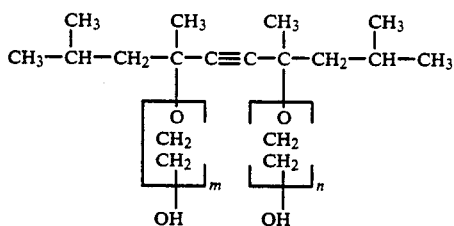

wherein $m+n = 1.3$ to 30, said amount of said surfactant being effective to reduce the Einlehner abrasion of said pigment.

15. A process for decreasing the Einlehner abrasion of an abrasive pigment which consists essentially of incorporating therewith a minor amount of a water-soluble nonionic surfactant of the general formula:

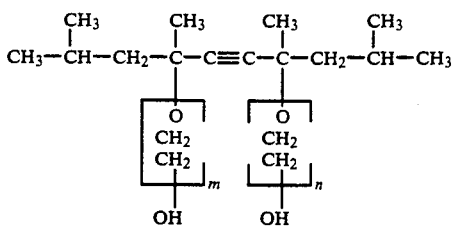

wherein $m+n = 1.3$ to 30, said slurry being free from hydrous kaolin and the amount of said surfactant being effective to reduce the abrasion of said pigment.

16. The process of claim 15 wherein said pigment is selected from the group consisting of metakaolin, fully calcined kaolin and mixtures thereof.

17. The process of claim 15 wherein said pigment is in the form of an aqueous slurry that is free from an organic colloidal thickening agent.

18. The process of claim 15 wherein said surfactant is added to a previously formed slurry of calcined kaolin pigment containing up to 0.2% by weight of a polyacrylate salt dispersant.

* * * * *